(12) United States Patent
Rasche et al.

(10) Patent No.: US 7,262,873 B1
(45) Date of Patent: Aug. 28, 2007

(54) PHOTOPRINTER ACCESS TO REMOTE DATA

(75) Inventors: Galen Arthur Rasche, Lexington, KY (US); Timothy John Rademacher, Lexington, KY (US); Christine Ann Trinkle, Hebron, KY (US); Barry Richard Cavill, Lexington, KY (US); William Henry Reed, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/610,129

(22) Filed: Jul. 5, 2000

(51) Int. Cl.
*G06K 15/02* (2006.01)
*G06F 15/00* (2006.01)

(52) U.S. Cl. .................. 358/1.15; 358/302; 348/207.2

(58) Field of Classification Search .......... 358/1.1–1.9, 358/1.11–1.18, 527, 302, 296; 348/207.2; 399/8, 9, 75
See application file for complete search history.

(56) References Cited

U.S. PATENT DOCUMENTS

| | | | |
|---|---|---|---|
| 4,586,147 A | 4/1986 | Tadokoro | |
| 4,727,589 A | 2/1988 | Hirose et al. | |
| 4,759,053 A * | 7/1988 | Satomi et al. | 379/100 |
| 4,901,075 A | 2/1990 | Vogel | |
| 4,975,859 A | 12/1990 | Takagishi et al. | |
| 4,994,986 A | 2/1991 | Cihiwsky et al. | |
| 5,045,880 A | 9/1991 | Evanitsky et al. | |
| 5,148,293 A | 9/1992 | Miyachi | |
| 5,175,821 A | 12/1992 | Dutcher et al. | |
| 5,297,246 A | 3/1994 | Horiuchi et al. | |
| 5,303,067 A | 4/1994 | Kang et al. | |
| 5,371,873 A | 12/1994 | Niwa | |
| 5,461,701 A | 10/1995 | Voth | |
| 5,481,742 A | 1/1996 | Worley et al. | |
| 5,483,653 A | 1/1996 | Furman | |
| 5,579,449 A | 11/1996 | Strobel | |
| 5,581,669 A | 12/1996 | Voth | |
| 5,590,245 A | 12/1996 | Leamy et al. | |
| 5,619,623 A | 4/1997 | Takayanagi et al. | |
| 5,636,333 A | 6/1997 | Davidson, Jr. et al. | |
| 5,638,521 A | 6/1997 | Buchala et al. | |
| 5,682,441 A * | 10/1997 | Ligtenberg et al. | 382/232 |
| 5,687,301 A | 11/1997 | Stokes et al. | |
| 5,694,528 A | 12/1997 | Hube | |
| 5,696,894 A | 12/1997 | Ono | |
| 5,699,493 A | 12/1997 | Davidson, Jr. et al. | |
| 5,699,494 A * | 12/1997 | Colbert et al. | 358/1.15 |
| 5,699,526 A | 12/1997 | Siefert | |
| 5,706,104 A | 1/1998 | Sugiura et al. | |
| 5,720,015 A | 2/1998 | Martin et al. | |
| 5,724,070 A | 3/1998 | Denninghoff et al. | |

(Continued)

OTHER PUBLICATIONS

Lexmark, "Lexmark Photo Jetprinter 5770, Jan. 12, 2000,".

(Continued)

*Primary Examiner*—King Y. Poon
(74) *Attorney, Agent, or Firm*—Geoffrey Oberhaus

(57) ABSTRACT

A photoprinter accesses remote digital photographs and files. A computer readable medium has one or more files, such as digital photographs. A computer has access to the files on the computer readable medium. A communication link connects the computer to a photoprinter. The photoprinter has a selection mechanism and access to the computer readable medium over the communication link in response to a user☐s input to the selection mechanism.

11 Claims, 2 Drawing Sheets

U.S. PATENT DOCUMENTS

| | | | |
|---|---|---|---|
| 5,727,135 | A | 3/1998 | Webb et al. |
| 5,729,666 | A | 3/1998 | Konsella et al. |
| 5,740,335 | A | 4/1998 | Takayanagi et al. |
| 5,742,845 | A | 4/1998 | Wagner |
| 5,758,041 | A | 5/1998 | Shimura |
| 5,761,662 | A | 6/1998 | Dasan |
| 5,764,918 | A | 6/1998 | Poulter |
| 5,768,485 | A | 6/1998 | Shimizu |
| 5,768,495 | A | 6/1998 | Campbell et al. |
| 5,768,528 | A | 6/1998 | Stumm |
| 5,778,163 | A | 7/1998 | Terajima |
| 5,790,977 | A | 8/1998 | Ezekiel |
| 5,797,061 | A * | 8/1998 | Overall et al. ............ 399/27 |
| 5,819,015 | A | 10/1998 | Martin et al. |
| 5,825,990 | A | 10/1998 | Heo et al. |
| 5,841,885 | A | 11/1998 | Neff et al. |
| 5,845,074 | A | 12/1998 | Kobata |
| 5,845,144 | A | 12/1998 | Tateyama et al. |
| 5,864,651 | A | 1/1999 | Lavie et al. |
| 5,870,533 | A | 2/1999 | Takagi |
| 5,870,769 | A | 2/1999 | Freund |
| 5,878,196 | A | 3/1999 | Suzuki |
| 5,930,463 | A | 7/1999 | Park |
| 5,963,641 | A | 10/1999 | Crandall et al. |
| 5,966,508 | A | 10/1999 | Terajima |
| 6,034,785 | A * | 3/2000 | Itoh ...................... 358/1.18 |
| 6,061,665 | A * | 5/2000 | Bahreman ................ 705/40 |
| 6,356,357 | B1 | 3/2002 | Anderson et al. |
| 6,417,937 | B1 * | 7/2002 | Batten et al. ............ 358/487 |
| 6,473,498 | B1 * | 10/2002 | Foth .................... 379/93.09 |
| 6,504,960 | B2 | 1/2003 | Takahashi |
| 6,552,743 | B1 | 4/2003 | Rissman |
| 6,628,825 | B1 * | 9/2003 | Yamazoe et al. ......... 382/167 |

OTHER PUBLICATIONS

Kodak, "Kodak PM 100 by Lexmark, Jan. 12, 2000,".
Hewlett Packard, "HP PhotoSmart P1000 Printer, Product Overview, Data Sheet, Feb. 23, 2000,".
Hewlett Packard, "Hewlett Packard, Brochure, PhtooSmart P1000/P1100 Printers, Jul. 1999,".
Hewlett Packard, "Hewlett Packard, Brochure HP PhotoSmart P1000/P1100 Printers Jul. 1999,".
Canon, "Canon, PowerShot A50, Brochure Japan,".
Epson, "Epson (Color Imaging), Super Colario Photo CP-800, Brochure, Japan, Jun. 29, 1999,".
Epson, "Epson (Color Imaging), printon, Full-Auto AI Photo Processor, Brochure, Japan, May 5, 1999,".
Fuji, "Fujifilm (I & I—Imaging & Information), Digital Printer TX-70, Brochure, Japan, Oct. 1998,".
Fuji, "Fujifilm (I & I—Imaging & Information), Digital Camera FinePix 1500, Brochure, Japan, Jun. 1999,".
Fuji, "Fujifilm (I & I—Imaging & Information), Digital Camera, FinePix 2900z, Brochure, Japan, Jul. 1999,".
Kodak, "Kodak, DC240 Zoom, Brochure, Japan, Apr. 1999,".
Kodak, "Kodak, DC280J Zoom, Brochure, Japan, Jul. 1999,".
Konica, "Konica, Q-M200, Brochure, Japan,".
Nikon, "Nikon, CoolPix950—CoolPix700, Brochure, Japan, May 21, 1999,".
Olympus, "Olympus, CAMEDIA P-330, Brochure, Japan,".
Olympus, "Olympus, CAMEDIA C-900Zoom, C-830L, P-330, Brochure, Japan,".
Olympus, "Olympus, CAMEDIA C-2000ZOOM, Brochure, Japan,".
Panasonic, "Panasonic, COOLSHOTIIMega LK-RQ1302, Brochure, Japan, Jun. 1999,".
Ricoh, "Ricoh, RDC-5000, Brochure, Japan,".
Sanyo, "Sanyo, LCD Digital Camera DSC-X110, Brochure, Japan, Feb. 1999,".
Sony, "Sony, Digital Photo DPP-MS300, Brochure, Japan, Mar. 1999,".
Sony, "Sony, Cyber-shot Digital Still Camera DSC-F55K, Brochure, Japan, Jun. 1999,".
Toshiba, "Toshiba, Digital Still Camera, Allretto M4, Brochure, Japan,".

* cited by examiner

PHOTOPRINTER ACCESS TO REMOTE DATA

TECHNICAL FIELD

This invention relates to the field of printer apparatuses and methods for using the same, and will be specifically disclosed in the context of stand-alone printers adapted to print digital photographs.

BACKGROUND OF THE INVENTION

The advent of computers have fundamentally changed the way images can be stored, manipulated, and printed. Images can now be captured by digital devices, such as digital cameras and scanners, and stored digitally. A digitally stored image can then be transmitted, enhanced, and manipulated through computer programs. Moreover, as digital technology has improved and associated costs fallen, the resolution of the images captured by these devices continues to improve, and in many cases approaches or exceeds the quality of traditional film photography.

Traditionally, to use a digital image one needed a computer. The computer would be loaded with a variety of different programs to transmit, enhance and manipulate the digital images. To obtain a hard copy of the digital image, the user would direct the computer with an appropriate series of commands to send a print job from the computer to a traditional printer. While the traditional model works, it does have attendant shortcomings, such as being expensive, complicated, non-portable, etc. To combat such shortcomings, various manufacturers began offering stand-alone printers designed to print digital images. One example of a stand-alone printer is disclosed in U.S. patent application Ser. No. 09/164,500, filed on Oct. 1, 1998. While stand-alone printers have proven to have remarkable benefits over the traditional model, the present invention offers even more benefits and improvements for stand-alone printers.

SUMMARY OF THE INVENTION

Accordingly, an object of the invention is to provide an improved stand-alone printer. Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the present invention is a printer configuration. A computer readable medium comprises data, such as digital photographs or other files. A computer has access to the data on the computer readable medium. A communication link is connected to the computer. A photoprinter is also connected to the communication link and is in communication with the computer. The photoprinter has a selection mechanism and access to the data over the communication link in response to a user's input to the selection mechanism on the photoprinter.

Another aspect of the present invention is a printer configuration. A computer has a plurality of digital photographs on a computer readable medium. A communication link is connected to the computer. A photoprinter is connected to the computer via the communication link. The photoprinter has mean for accessing the digital photographs.

Yet another aspect of the present invention is a method for accessing digital photographs. One or more digital photographs are placed on the computer. A communication link is established between the photoprinter and the computer. A request is inputted to the photoprinter by a user. The digital photographs are accessed by the photoprinter in response to the request.

Still another aspect of the present invention is a method for diagnosing a printer. A stand-alone printer, such as a photoprinter, is obtained. A communication link is established between the stand-alone printer and a computer. Instructions are transmitted over the communication link from the computer to the stand-alone printer. One or more functions of the stand-alone printer are diagnosed in accordance with the transmitted instructions.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

Figure 1:
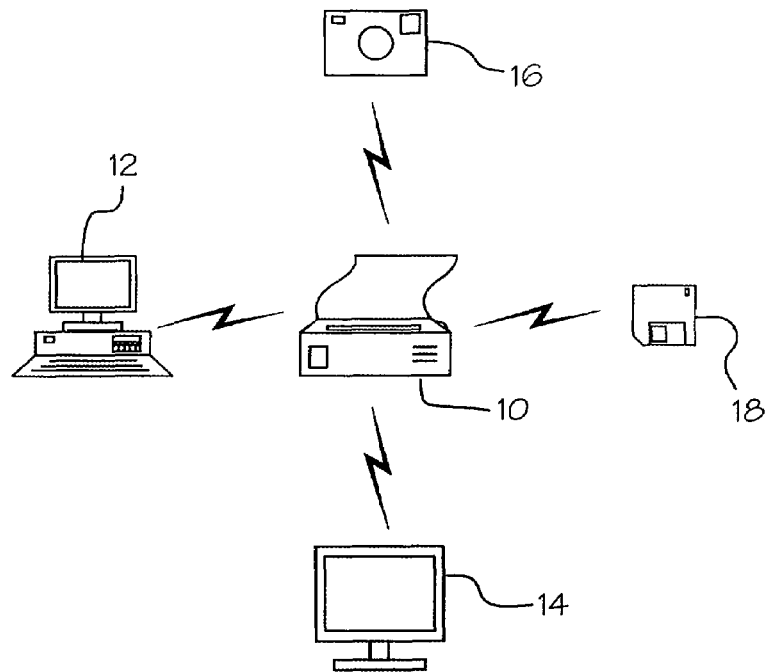
FIG. 1 depicts a photoprinter communicating with a variety of external components.

Reference will now be made to the present preferred embodiment of the invention, an example of which is illustrated in the accompanying drawings, wherein like numerals indicate the same element throughout the views. FIG. 1 illustrates one embodiment of a photoprinter 10. As used herein, a "photoprinter" refers to a stand-alone appliance for printing digital photographs onto a printable medium. A "digital photograph□ is a photographic image captured by a light sensing electronic device (e.g., CCD, CMOS, CID, or the like) and converted into a digital file capable of being stored on a computer readable medium. The term "stand-alone" means that the printer is capable of processing and printing digital files independent of external host device, such as a computer, wherein processing means calculating a pixel pattern to be printed on the printable medium that represents the corresponding digital file (sometimes referred to as ripping or generating printing code). For instance, a printer is considered stand-alone if an external device merely passes a digital photograph to the printer and the printer contains the logic for processing and printing the digital photograph. The foregoing definitions are inclusive and open-ended. For example, a stand-alone printer may additionally be capable of receiving printing code from an external device. As a further example, a photoprinter may additionally be capable of processing and printing digital files other than digital photographs, such as text files, word processing files, HTML files, and the like.

The photoprinter 10 is operative to print digital photographs on printable media (e.g., paper, glossy film or photo paper, index cards, labels, envelopes, transparencies, coated paper, cloth, etc.). In one preferred embodiment, the photoprinter 10 works by transferring an ink (e.g., toner, dye, pigment, wax, carbon, etc.) onto a printable medium. For instance, the photoprinter 10 can employ conventional thermal ink jet technology, however, it is contemplated that the present invention can be adapted for use with other types of ink jet technologies, such as piezo ink jet. In addition, the present invention can be adapted for use with other printer technologies, such as electrophotography, dye diffusion, thermal transfer, and the like.

While the photoprinter 10 operates as a stand-alone printer, it can nevertheless communicate with a variety of external components, only a portion of which are illustrated in FIG. 1. In the present example, the photoprinter 10 can communicate to a computer 12 using any one of a variety of different communication links, such as parallel cables, serial cables, telephone lines, universal serial bus USB, Firewire, Bluetooth, fiber optics, infrared IR, radio frequency RF, network interface cards (e.g., Ethernet, token ring, etc.), and the like. The computer 12 can be any conventional or special purpose computer, such as a desktop computer, a tower computer, a micro-computer, a mini-computer, server, workstation, palmtop computer, notebook computer, PDA, or the like. Through the communication link, the photoprinter 10 can receive digital photographs from the computer 12 for processing and printing. In one embodiment, the computer 12 is programmed to generate printing code (e.g., via locally loaded print drivers) and the photoprinter 10 is capable of receiving the externally processed printing code for direct printing. As such, the photoprinter 10 would have dual functionality: a stand-alone printer as well as a more conventional printer for receiving commands from an external device.

In the present example, the photoprinter 10 can also communicate with an external display 14 (e.g., a television, monitor, LCD, or the like) using an appropriate communication link. In such a configuration, the photoprinter 10 can generate and send appropriate signals to present a user interface to operate the photoprinter 10 or preview digital photographs on the display 14. The photoprinter 10 also can communicate with a digital camera 16 using an appropriate communication link. Typically, a digital camera 16 includes one or more lenses that focus light into an image on a light sensing electronic device, and stores the image as a digital photograph. In one embodiment, the photoprinter 10 can retrieve, process and print digital photographs stored in the camera 16.

The photoprinter 10 can also communicate with a computer readable medium 18, shown here as a floppy diskette. A computer readable medium stores information readable by a computer, such as programs, data files, etc. As one with ordinary skill in the art will readily appreciate, a computer readable medium can take a variety of forms, including magnetic storage (such as hard drives, floppy diskettes, tape, etc.), optical storage (such as laser disks, compact disks, digital video disks DVD, etc.), electronic storage (such as random access memory RAM, read only memory "ROM", programmable read only memory PROM, flash memory, memory sticks, etc.), and the like. Some types of computer readable media, which are sometimes described as being non-volatile, can retain data in the absence of power so that the information is available when power is restored.

The photoprinter 10 preferably interfaces with the computer readable medium 18 using an internal or external drive. As used herein, the term drive is intended to mean a structure which is capable of interfacing with (e.g., reading from and/or writing to) a computer readable medium. Naturally, suitable drives will vary depending upon the specific computer readable medium 18 being employed. In a preferred embodiment, the photoprinter includes first and second drives each adapted to receive a solid state flash memory card. The first and second drives are preferably both internal drives. Flash memory cards, due to their very small size and lightweight, are a highly portable computer readable medium which are electrically re-writable and are non-volatile. More preferably, the first and second drives are adapted to receive different types of flash memory cards, such as a NAND type of flash memory card (e.g., a SMART MEDIA card developed by Toshiba, Inc.) or a PCMCIA type of flash memory card (e.g., the COMPACTFLASH developed by SanDisk, Inc.).

Figure 2:
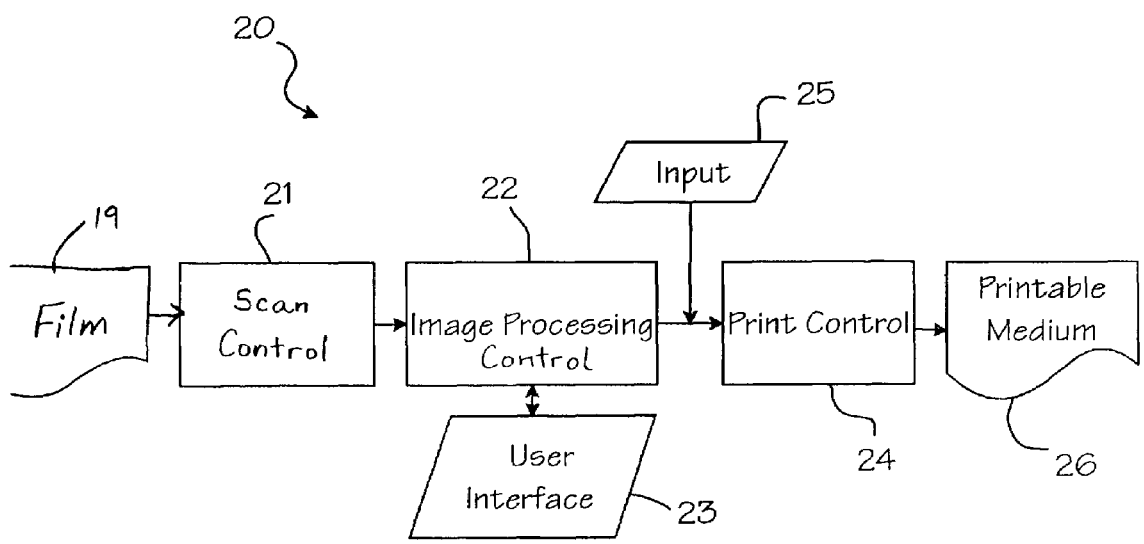
FIG. 2 depicts an operational block diagram for the photoprinter of FIG. 1.

FIG. 2 depicts a preferred operational block diagram 20 for the photoprinter 10. One or more digital photographs 21 are input to the image processing block 22, located internal to the photoprinter 10. The digital photographs 21 can be received from a variety of different sources, whether internal to the photoprinter 10 or from an external source via a drive, communications link, or the like. Furthermore, the digital photographs 21 can take any one of a variety of different file formats, whether raster, vector, or other format (e.g., GIF, TIFF, PCX, JPEG, EXIF, CIFF, JFIF, etc.).

The image processing block 22 is responsible for calculating a pixel pattern to be printed on the printable medium 26 that represents the corresponding digital photographs 21, sometimes referred to in the art as generating printing code. The image processing block 22 may optionally enhance the digital photographs 21. For instance, photo enhancement software, such as the PICTURE IQ software by Digital Intelligence, may be incorporated into the image processing 22. Further, image processing 22 may optionally include a variety of different resources to modify the printed rendition of the digital photographs 21, such as the addition of text, frames, templates, scaling, etc. Enhancements or resources may be implemented before and/or after the digital photographs 21 are converted to printing code. A user interface 23 is provided to allow a user to interact with and/or direct the image processing block 22 (e.g., controlling the enhancements and/or resources). The user interface 23 may be integral to the photoprinter 10 or located on an external component. Preferably, however, the photoprinter 10 includes an LCD display with one or more buttons or other input devices. Optionally, the user interface 23 may take the form of a series of instructions accompanying the digital photographs 21, such as a digital print order format DPOF.

The print code generated during image processing 22 is passed to the print control 24. In the cases where printing code is generated from an external source (e.g., computer 12), such printing code can be input 25 directly to the print control 24, thus bypassing the image processing block 22. The print control 24 is responsible for directing the physical transference of the pixel pattern represented by the printing code to the printable medium 26. The photoprinter 10 is preferably in the form of a thermal ink jet printer having one or more conventional thermal ink jet print heads. During printing, the print control 24 directs one or more motors to move the printable medium 26 longitudinally relative to the photoprinter 10 so that it is properly positioned for deposition of an ink pattern or swath. Once the printable medium 26 is in position, the print control 24 directs the print head to move along a conventional print head carriage in a direction transverse to the longitudinal direction while firing droplets of ink onto the surface of the printable medium 26. The print head may make one or more of these transverse passes to complete printing for the swath. After the swath is complete, the printable medium's 26 position is adjusted longitudinally for the printing of the next swath.

Figure 3:
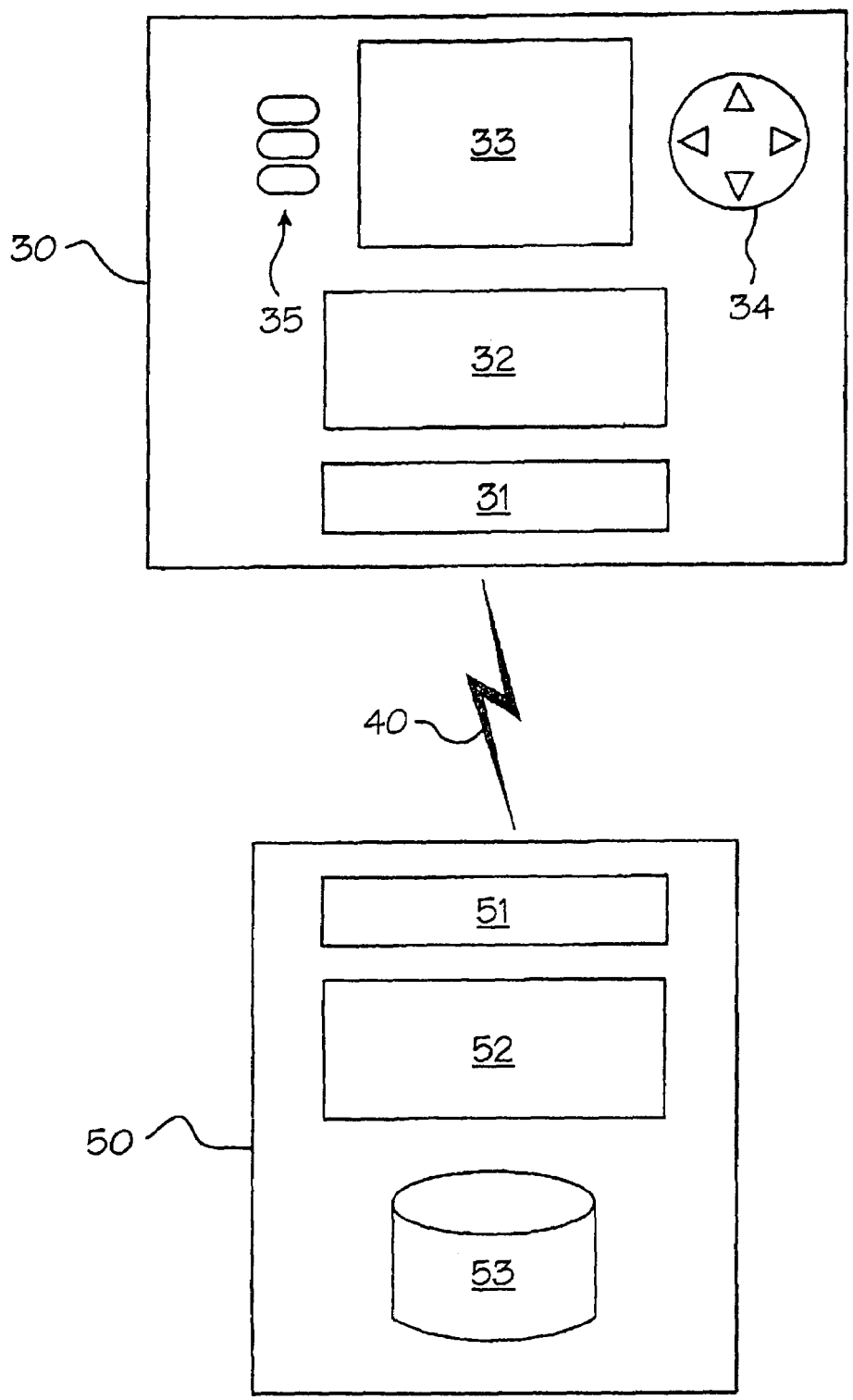
FIG. 3 depicts a schematic diagram of a photoprinter configuration.

FIG. 3 depicts a schematic diagram of photoprinter configuration. The photoprinter 30 is connected to the computer 50, which can be any conventional or special purpose computer or a network of computers, via the communication link 40. The photoprinter 30 includes an input/output I/O module 31 which allows the photoprinter 30 can receive and/or send information across the communications link 40. For instance, the I/O module 31 can take the form of protocol software and drivers compatible with the particular type of communication link 40. The photoprinter 30 also includes a software module 32, which in cooperation with the I/O module 40, provides the logic for the photoprinter 30 to request, receive and process information over the communication link 40. For instance, the software module 32 can comprise one or more programs compatible with the resident operating system to perform various functions on the photoprinter 30. Similarly, the remote computer 50 includes an I/O module 51 and a software module 52, which work in cooperation with the I/O module 31 and software module 32. The remote computer 50 has access to computer readable medium 53, which may be local or remote to the computer 50.

The photoprinter 30 includes a display 33, such as textual or graphical LCD, for presenting information to the user. Based on the instructions embodied in the software module 32, a user interface (e.g. menus, icons, GUI, or the like) is presented on the display 33 providing one or options to the user. A variety of selection mechanisms are provided for a user to interact with the photoprinter 30. In this example, a directional toggle pad 34 allows a user to interact with items presented on the display 33. For instance, using the pad 34 the user can traverse menu or icon options presented on the display 33. The photoprinter 30 also includes other buttons 35 as selections mechanisms, which may be used independently or in cooperation with the display 33. A variety of other selection mechanisms are also contemplated, including a keyboard, mouse, track ball, touch pad, joy stick, touch sensitive screens, audible input devices, and the like. Based on a user's input to the selection mechanisms, the software module 32 processes the user's selected option.

Using this photoprinter configuration, the photoprinter 30 can access data on the computer readable medium 53 via the communication link 40 for a variety of purposes. Consider the following examples, which serve to illustrate several embodiments of the present invention. Many other embodiments are also contemplated.

EXAMPLE 1

The photoprinter 30 can upload files to a personal computer PC 50, as well as download, view and print files (e.g. digital photographs or other data files) contained the computer readable medium 53 (e.g. the PC's hard drive, Zip drive, CD/DVD drive, floppy drive, and the like), allowing a user to move files to and from the PC 50 using only the selection mechanisms on the photoprinter 30. The communications link 40 preferably takes the form of a traditional PC/printer connection, such as USB or parallel cable, but other communication links may also be employed. Once the photoprinter 30 is connected, the software module 32 presents a user interface on the display 33, such as a graphical user interface similar to Windows Explorer, a textual user interface, or other types of user interfaces. Using the pad 34 and/or buttons 35, the user may navigate through files and folders on the PC's 50 computer readable medium 53. The software module 52 running on the PC 50 is responsible for detecting and responding to data-request interrupts generated by the software module 32 on the photoprinter 30. The file names are displayed on the photoprinter's display 33. Further, thumbnail renditions of files 53, including digital photographs, may be presented on the display 33. Similarly, the logic and user interface encoded in the software module 32 may be used to upload, download, view and print files from other computer readable medium, including flash memory drives integral with the photoprinter 30 and external drives independent of the PC 50, such as a stand-alone Zip drive.

Once the user has chosen a file, it can be printed or copied to any of the available computer readable media. If the user wishes to print a file from the PC 50 that is not a digital photograph, software on the PC 50, which can be integral with or separate from the software module 52, can convert the file into printing code necessary for printing. Preferably, this printing code, not the file itself, is then sent to the photoprinter 30 for printing. For instance, if the user selects a spreadsheet document, the software program will recognize the format of the file and generate the printing code for the file. The printing code will be transferred directly to the print control 24 for printing.

Another feature is an upload option encoded in the software module 32, which is presented on the user interface on the display 33. The user can choose to upload either selected files (e.g. digital photographs) or the entire contents of a local removable storage media to a chosen location on the PC 50 (e.g. on the PC's hard drive). This makes it extremely easy to move files to the PC 50, enabling the user to clear the removable storage media card and reuse the space.

EXAMPLE 2

The photoprinter 30 is capable of creating a remote connection directly to the 50 PC via the communication link 40, and use this remote connection to download, upload, view, and print files located on the PC's memory. For instance, a telephone modem communication link 40 can be established between the photoprinter 30 and the PC 50 using a modem integral to the photoprinter 30. Alternatively, the photoprinter 30 could use a type II CompactFlash modem inserted in an drive integral to the photoprinter 30. In another alternative, an external modem can be connected to the photoprinter 30, such a USB modem device where the photoprinter 30 is a USB host, to establish the communication link 40. Naturally, a variety of other communication links can also be employed.

Once the modem is connected to the photoprinter 30, based on a user interface programmed in the software module 32, the user selects a dial-up option from the menu on the display 33. Preferably, the software module 32 stores the telephone number to be called in memory, and further requires the user to enter a password. A second modem device is connected to the PC 50, and the I/O module 51 running on the PC 50 is responsible for controlling the PC's modem and answering incoming calls. The software module 52 checks the entered password once a connection is established to determine whether the photoprinter 30 will have access to the PC 50. Once access is permitted, the software module 52 allows the photoprinter 30 to explore the computer's computer readable medium 53 and download, upload, view and print files, in much the same way as example 1, above.

One scenario in which this example is useful is someone traveling on vacation. Travelers often find themselves disappointed in having left an important file on their PC 50, or wishing they could store the contents of the removable storage media somewhere else in order to reuse the space. By taking a modem, photoprinter 30, and their digital camera, the user is able to print digital photographs as soon as they are taken, and also able to free up valuable memory space on their camera's removable storage media by dialing home and uploading the digital photographs to their PC 50. This allows the user to spend much less money on expensive storage media.

EXAMPLE 3

Many film processors offer a service of scanning of photographic film to create digital photographs. When exposed film is submitted for developing and prints, the customer may have the option of requesting that their negatives be scanned (typically for an additional fee) and the digital photographs returned on diskette or compact disk (e.g. Picture CD from Kodak, Pictures on Disk from Seattle Filmworks, and the like). Alternatively, the film processor may place the digital photographs in a database that customers can access with a PC on the Internet or other network connection (e.g. Kodak PictureVision, PhotoNet, and the like). In addition, digital photographs captured on digital cameras can also be uploaded to a network. Typically, customers open an online account and pay a monthly fee to store, access, e-mail, and download their digital photographs. A variety of services are provided where digital photographs can be printed on traditional silver halide photo prints or on a variety of specialty items like T-shirts, mouse pads, posters, and mugs. Once an image file is stored on a network, the customer has the option of ordering these specialty services or downloading the digital photograph for printing.

Through the communication link 40, the photoprinter 30 can access files (e.g. digital photographs) on the computer readable medium 53 (e.g. hard drive) of a remote server 50 participating in a network. For instance, the files on the network may be scanned from film or captured by digital cameras and stored on the server database. The software module 32 presents a user interface on the display 33, providing options for a user to access an online account managed by the software module 52. Via the communication link 40, the photoprinter 30 can access on-line accounts on the server 50, and download thumbnails and/or files on the computer readable medium 53 for printing, manipulation, local storage, or other uses.

In one embodiment, the customer enters account information (e.g. phone numbers, web page addresses, account numbers, passwords, and the like) on the photoprinter 33 setup menu so that access is automated and printing of files appears functionally equal to printing files stored locally on camera card or disk. It is contemplated that some service providers will charge separately for each scanned file that is downloaded, so each download would be recorded for billing purposes. To minimize unneeded expense and time, thumbnails of files stored on the computer readable medium 53 can be shown on the display 33 or downloaded to print an index print from which files may be selected for high-resolution printing.

The communication link 40 between the photoprinter 30 and the server 50 can be implemented in a variety of different ways, including a modem or network adapter integrated with the circuits of the photoprinter 30, a connector for type II CompactFlash cards could support optional (and easily installed) modem or network cards, an external modem or network adapter connected to the photoprinter 30 via photoprinter ports (e.g. parallel, USB, Firewire, com port, etc.), a host computer attached to the Internet or a network could be the link to the target files, and the like. In addition, other configurations can be used.

EXAMPLE 4

The photoprinter 30 uses the communication line 40 to perform diagnostic and troubleshooting tests under the direction of a remote server 50. Preferably, the server 50 performs most of the required processing, making it possible to add this functionality without using much of the photoprinter's 30 resources. Further, once the communication link 40 is established, new versions of photoprinter 30 code stored on the computer readable medium 53 (e.g. software module 32, image processing software, print control software, or other code or data) can be downloaded directly to the photoprinter 30.

In one embodiment, the customer would connect a USB modem to the USB host port of the photoprinter 30. A diagnostic mode could then be chosen form one of the photoprinter's menus presented on the display 33. Once the communication link 40 is established, the server 50 would do most of the work. Preferably, the software module 32 within the photoprinter 30 would be as simple as possible, thus saving valuable memory space. For instance, the software module 32 would allow the software module 52 in the server 50 to write to the display 33, read the inputs from the selection mechanisms 34, 35, read the photoprinter 30 memory, send data to the print control, and the like. The server 50 would initially check the photoprinter 30 code version and determine whether or not an upgrade is available. It would then perform a hardware check on the photocontroller as well as the electronic hardware of the photoprinter 30. Optionally, it could then begin an interactive check of the photoprinter's functions. For example, the server 50 could instruct the photoprinter 30 to formfeed and eject a sheet of paper, then ask the user if the function was performed correctly. If the photoprinter 30 fails, the server 50 would then display suggestions on how to fix the problem.

Additional functions could also be performed. For instance, the software module 32 could collect usage statistics on the printing habits/history of photoprinter 30. These statistics could include things such as page count, image count, ink drop counts, image size counts, and the like. The software module 32 could also keep track of which templates and photo functions were used the most. Once the photoprinter 30 is connected to the server 50, this statistical data could be easily relayed from the photoprinter 30 to the server 50. In addition, deals could be offered to entice customers to log in periodically (for the collection of this data). For example, the customer could download and print out a different coupon every three months if he/she logs in. The software module 32 would simply have to keep track of which serial numbers have taken advantage of which deals.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

We claim:

1. A printer configuration, comprising:
   a) a computer readable medium comprising data;
   b) a computer having access to the data on the computer readable medium; and
   c) a photoprinter in communication with the computer via a communication link, the photoprinter having a selection mechanism and having access to the data over the communication link in response to a user's input to the selection mechanism,
      wherein the photoprinter comprises a printing device capable of processing and printing digital photographs, acquired by a digital camera, independent of an external host device.

2. The printer configuration of claim 1, further comprising a user interface on the photoprinter having a plurality of options selectable by a user with the selection mechanism.

3. The printer configuration of claim 2, wherein the options include downloading files from the computer, uploading files to the computer, or printing files.

4. The printer configuration of claim 2, wherein the one or more files are presented on the user interface.

5. The printer configuration of claim 1, wherein the data comprises digital photographs.

6. The printer configuration of claim 1, wherein the data comprises executable code for running on the photoprinter.

7. The printer configuration of claim 1, wherein the computer is connected locally to the photoprinter.

8. The printer configuration of claim 1, wherein the computer is a server.

9. A printer configuration, comprising:
   a) a computer having a plurality of digital photographs on a computer readable medium; and
   b) a photoprinter communicating with the computer via a communication link, the photoprinter having means for accessing the digital photographs,
   wherein the photoprinter comprises a printing device capable of processing and printing digital photographs, acquired by a digital camera, independent of an external host device.

10. A method for accessing digital photographs on a computer, the method comprising the steps of:
    a) establishing a communication link between a photoprinter and the computer;
    b) receiving a request at the photoprinter from a user; and
    c) accessing the digital photographs with the photoprinter in response to the request, wherein the photoprinter comprises a printing device capable of processing and printing digital photographs, acquired by a digital camera, independent of an external host device.

11. The method of claim 10, wherein the step of accessing comprises downloading the digital photographs.

* * * * *